(12) United States Patent
Tuxen (10) Patent No.: US 8,692,688 B1
(45) Date of Patent: Apr. 8, 2014

(54) SENSOR SYSTEM AND ALGORITHM FOR RELIABLE NON-DELINEATED ON-STREET PARKING INDICATIONS

(76) Inventor: Gorm Tuxen, Ridgedale, MO (US)

( * ) Notice: Subject to any disclaimer, the term of this patent is extended or adjusted under 35 U.S.C. 154(b) by 185 days.

(21) Appl. No.: 13/352,057

(22) Filed: Jan. 17, 2012

(51) Int. Cl.
*B60Q 1/48* (2006.01)

(52) U.S. Cl.
USPC .................. 340/932.2; 340/425.5; 340/686.1

(58) Field of Classification Search
USPC .............. 340/932.2, 933, 988, 995.1, 995.12, 340/942, 907, 916, 927, 937, 425.5, 468, 340/686.1, 687
See application file for complete search history.

(56) References Cited

U.S. PATENT DOCUMENTS

| | | | |
|---|---|---|---|
| 5,586,031 A * | 12/1996 | Fussl | 701/41 |
| 5,910,782 A * | 6/1999 | Schmitt et al. | 340/995.12 |
| 5,940,481 A | 8/1999 | Zeitman | |
| 6,285,297 B1 * | 9/2001 | Ball | 340/932.2 |
| 6,426,708 B1 * | 7/2002 | Trajkovic et al. | 340/932.2 |
| 6,927,700 B1 * | 8/2005 | Quinn | 340/932.2 |
| 6,970,101 B1 * | 11/2005 | Squire et al. | 340/932.2 |
| 7,026,954 B2 | 4/2006 | Slemmer et al. | |
| 7,289,040 B2 * | 10/2007 | Ponert | 340/941 |
| 7,688,222 B2 * | 3/2010 | Peddie et al. | 340/905 |
| 7,825,827 B2 | 11/2010 | Jang et al. | |
| 7,893,848 B2 | 2/2011 | Chew | |
| 7,899,583 B2 | 3/2011 | Mendelson | |
| 8,175,803 B2 * | 5/2012 | Caraballo | 701/426 |
| 2002/0171562 A1 | 11/2002 | Muraki | |
| 2005/0190077 A1 | 9/2005 | Kavaler | |
| 2005/0203704 A1 * | 9/2005 | Frank et al. | 701/300 |
| 2006/0033641 A1 | 2/2006 | Jaupitre et al. | |
| 2012/0127308 A1 * | 5/2012 | Eldershaw et al. | 348/143 |

FOREIGN PATENT DOCUMENTS

| | | |
|---|---|---|
| WO | 2006/063079 | 6/2006 |
| WO | 2007/027818 | 8/2007 |
| WO | 2010/033024 | 3/2010 |

* cited by examiner

*Primary Examiner* — Daniel Previl
(74) *Attorney, Agent, or Firm* — Wyatt, Tarrant & Combs, LLP; William S. Parks (57) ABSTRACT

A method and system of providing information and directions to drivers in relation to the availability of parallel street parking places within a certain area is provided. Such a method includes the utilization of properly placed sensors working in combination with a particular algorithm to provide reliable information in terms of actual availability for certain vehicle sizes on a continuous basis. As well, this system accords a manner of properly assessing actual parking place sizes, potential obstacles (such as driveways, hydrants, and the like), and other important information for electronic relay to any driver (through, for instance, a suitable wireless program and router to a hand-held or dashboard mounted communicator) to locate and assess for himself the potential for utilizing such a vacant parking place. Furthermore, such a system may also provide an effective means to properly charge a driver for parking without the need for parking meters or other like mechanisms.

20 Claims, 6 Drawing Sheets

SENSOR SYSTEM AND ALGORITHM FOR RELIABLE NON-DELINEATED ON-STREET PARKING INDICATIONS

FIELD OF THE INVENTION

This invention relates to a method and system of providing information and directions to drivers in relation to the availability of unmarked parallel street parking places within a certain area. Such a method includes the utilization of properly placed sensors working in combination with a particular algorithm to provide reliable information in terms of actual availability for certain vehicle sizes on a continuous basis. As well, this system accords a manner of properly assessing actual parking place sizes, potential obstacles (such as driveways, hydrants, and the like), and other important information for electronic relay to any driver (through, for instance, a suitable wireless program and router to a hand-held or dashboard mounted communicator) to locate and assess for himself the potential for utilizing such a vacant parking place. Furthermore, such a system may also provide an effective means to properly charge a driver for parking without the need for parking meters or other like mechanisms.

BACKGROUND OF THE PRIOR ART

As populations grow and more and more vehicles flood the roadways, parking locations have become problematic in terms of scarcity and proximity to desired sites, particularly in urban settings. Likewise, the presence and operation of large amounts of fuel-burning vehicles leads to undesirable increased air pollution levels, particularly in crowded urban settings. Additionally, difficulties in locating parking spaces in such locations generally requires drivers to undertake prolonged searching for such a purpose, thus resulting, with cumulative numbers of such vehicles facing such a necessary experience, in higher pollution levels on average.

As well, the capability of municipalities to afford proper infrastructure for vehicle parking is typically undertaken through metering devices, although such systems require constant monitoring to ensure proper payments have been made to the necessary effect. In tandem, then, there is a growing issue pertaining to the difficulties inherent in the availability and proper revenue generation of sufficient parking places in such urban locations. Parking garages, decks, commuter lots and other secluded parking lots have been constructed in the past to meet a certain degree of drivers' parking demands. However, these structures and areas are generally limited in terms of locations, typically cost a flat fee for entry, regardless of time spent, or, alternatively, require hourly payments of certain high levels that must be paid before egress is permitted, all in a manner to recoup the costs involved with the overall construction, necessitate either human or mechanical intervention to guarantee payments are made, and other machinery to prevent driver egress until payments have been received (such as gate arms, for example). In essence, although such structures and parking areas have proven successful to a certain degree, there remains a need for other alternatives to drivers who do not wish to be beholden to such strictures.

In particular, as alluded to above, street parking, rather than lot parking, has been an attractive alternative to many drivers, specifically as a means to allow for parking in a vicinity closer to a specific target location, reducing individual costs, and increasing freedom of movement through simple ingress and egress from a parallel parking space onto a roadway (as opposed to ingress into and egress from a parking facility that is controlled and requires some type payment prior to leaving). The greatest difficulty such street parking alternatives pose is the typical requirement for a driver to make numerous passes along certain streets to search for a any vacant space, let alone one that is of proper size to allow for such a driver to undertake a parallel parking operation without contacting adjacent vehicles, as well as to allow for sufficient space to facilitate subsequent egress from the target space. As an alternative to controlled parking facilities and areas, then, although street parking may be desirable to drivers, the inherent problems with such an unreliable possibility has made such a parking alternative not only difficult to manage, but also potentially dangerous as drivers take too many chances due to time constraints and/or impatience.

There are actually two different systems provided by municipalities with regard to street parking arrangements: marked spaces and unmarked spaces. Marked configurations provide separated and properly delineated locations for drivers to choose in comparison with unmarked types, for obvious reasons. Such marked spaces inherently provide not only set distances, locations, and metering possibilities for such municipal entities, but also, to the contrary, inefficient overall space usage and limited revenue generation as a result. San Francisco has begun a pilot program utilizing a sensor system to provide notifications to drivers of empty marked spaces as well as a relatively straightforward manner of implementing charging methods to generate revenue directly in relation to marked space usage. Such an overall system, however, is relatively straightforward itself in that notification of such available marked spaces is much easier through specific sensor utilization. As well, correlating such sensor technology to a metering system that permits indications of parking initiation and ultimately parking space evacuation merely requires indications of sensor operation in the limited areas of such marked locations. In other words, the implementation of a notification/metering system limited to specific delineated parking spaces involves mere sensor activation and deactivation specifically for the sensors present within the area related directly to the marked spaces themselves. Unfortunately, as alluded to above, such marked space usage is rather inefficient, particularly in terms of allowing for various vehicle sizes (i.e., compact vehicles may fit easily within a space whereas a moving van will require far more space, and thus, in certain municipalities may not be permitted to park on a street). The capability of avoiding such inefficiencies with available on-street parking spaces while also according a reliable method of notifying drivers of vacant space of suitable size for specific types of vehicles would not only allow for reduction of necessary paint or other indication materials for marked spaces, but also would permit more efficient space usage and, overall, a reduction in pollution through allowing drivers a more direct route to a possible parking space. Additionally, the capability of implementing a suitable metering and charging method in relation to such an unmarked parking space system would allow, ultimately, to effective and more efficient revenue generation as the amount of available parking spaces would be increased through the omission of demarcations. To date, however, such has not been accorded by the on-street parking industry.

Controlled parking environments (such as lots and garages at public events, airports, stadiums, commuter lots, office buildings or other large parking areas) have been developed with certain marked space notifications in the past, although even these methods have proven problematic and time-consuming to a certain degree due to the difficulties in identifying available parking space locations, particularly in lots that are partially filled or almost filled to capacity. Such parking facilities, however, have, at least in some circumstances, been outfitted with either manual counting means or sensor devices to provide indications to drivers in various ways as to vacant spaces, both in terms of number and, at times, locations. Such notification operations, however, are limited in their scope to such location and number issues; since each parking space present within the confines of outfitted parking facilities are pre-sized and provided specifically for vehicles of various sizes, and, as such, the facilities themselves are configured to compensate for specific numbers of spaces properly aligned for such vehicles to park appropriately in side-by-side relation (and to allow ingress and egress from such spaces easily as result), such monitoring and consequent notification of availability and location is relatively simple and straightforward. Likewise, there is no need nor concern with providing any notification basis with regard to parking availability for vehicles that are parked end-to-end instead in such situations as the overall lot design generally includes such side-by-side arrangements (with limited possibilities of different space sizes based on the potential for smaller or larger vehicles that may be present). In any event, these prior parking lot notification schemes have basically pertained to set parking designations with specific parking configurations that are relatively easy to monitor as to vacancies and locations as a result. To the contrary, street parking, particularly such parking omitting any space demarcations, is highly erratic in principle since end-to-end, parallel parking requirements depend almost entirely on varied vehicle lengths and proper placement of such vehicles without any set configurations in place. Marked on-street parking spaces at least provide specific locations for drivers to select; again, though, such marked spaces are rather inefficient through limiting the amount of available spaces to too great a degree. For instance, with a standard block in New York City is $\frac{1}{8}^{th}$ of a mile, or 660 feet in length. With set spaces of 23 feet (with one foot between each marked space), roughly 27 standard vehicles may be parked (theoretically, as driveways, hydrants, and set distances from intersections would invariably limit such numbers to a smaller number, in actuality). The utilization of unmarked systems would thus increase the amount of available space by at least six (20 feet per vehicle instead of set 24 feet distances). Additionally, and as noted above, set limits of 23 feet (with another foot set between each space) would consequently limit the type of vehicle that may actual park within such set spaces. Unlined spaces would thus allow, again, for all types and sizes of vehicles to utilize such on-street possibilities. As such, a greater efficiency for on-street parking would be realized if marked spaces were not implemented for these reasons.

Even with unrestrained on-street parking being the norm, other considerations may impact the overall capability of such a system. For instance, numerous items that prevent certain parking locations (such as fire hydrants, driveways, and the like) exist that may cause difficulties for a driver to properly find and select a parking spot. Additionally, the chaotic state of filling up limited spaces in end-to-end arrangements, particularly with, again, myriad lengths of vehicles (from small sub-compact vehicles to large trucks, vans, and/or buses, for example) makes predictability for a driver as to the proper space size for his or her vehicle rather daunting, beyond the initial consideration of whether any space is available to being with. In other words, in comparison with set parking lot configurations, the availability of spaces present on city streets is, suffice it to say, a difficult issue for a driver to overcome, particularly in terms of finding a suitable (and legal) space in a desirable location. In those situations, the longer a driver continues to seek for an available on-street parking space, the more fuel is consumed, the greater pollution is generated, and the more time lost for the driver in terms of his or her own efficiencies. With large numbers of vehicles searching for open spaces on a daily basis, the greater the accumulative effect such fuel consumption, undesirable exhaust, and lost time issues create.

Additionally, in terms of street parking issues, notifications are not easy to provide beyond the fact that end-to-end parking presents an extremely difficult prediction capability (due to the fact that vehicles do not have static lengths, not to mention the fact that other obstacles, such as fire hydrants, etc., may be present, as noted above) and the manner of providing such notifications, if they are provided in that context, would not be provided through, for example, typical board displays or other types of updated signage in a set location (such as is generally employed within parking facilities). The breadth of the street parking area in question would be too great to permit such a display to have any effect, basically, as the entirety of the area at issue would require street-by-street notifications to drivers in order to provide up-to-date and reliable information. As it is, a single, or perhaps two, three, or four, signs strategically placed in the multi-street area in question would require a driver to pass by, read, and comprehend the information provided in order to allow for such an on-street notification system to be effective. In essence, although street by street notifications may be effective in on-street parking configurations, the same has not been found true for typical signage utilized for parking lot situations.

As well, street metering requires investment in technology that requires expenditures for purchase, implementation, upkeep, and constant monitoring to be effective. As a revenue stream, such a system is rather straightforward (as discussed above) for set parking spaces (and thus set sensors with specific activation and deactivation sequences in relation to the presence of a vehicle in the target space). For unmarked spaces, to the contrary, such a needed overall system is, for lack of a better word, nonexistent. Without set spaces, it is difficult to have metering devices devoted to specific spaces (not to mention, individual meters are rather expensive to implement, operate, and monitor). Even with meters with marked spaces, such systems are rather cumbersome and unreliable (drivers do not always pay into the device, and thus an attendant must constantly monitor such areas for proper utilization; furthermore, limited time periods available to a driver for coin or other currency input would require repeated visits to the parking location to avoid incurring parking violations) and, as discussed at great length, inefficient in terms of available spaces and thus overall available numbers of vehicles that may be present within such spaces at any one time; optimizing and maximizing space availability and correlating such to revenue generating capacity would be far more attractive, for obvious reasons. Unfortunately, the capability of effectively charging drivers for unmarked street parking is limited to honor systems (for instance, requiring drivers to pay into permanent structures located on the street itself, and receiving a dashboard ticket for display during parking) as well as constant monitoring to ensure payment has been made for such a benefit. Avoidance of such cumbersome and relatively expensive requirements, in addition to the ability to provide effective and reliable notification to drivers of available and suitably sized spaces within an unmarked on-street parking configuration, has simply not been a possibility.

ADVANTAGES AND SUMMARY OF THE INVENTION

One distinct advantage of the inventive system is the capability of providing reliable indications of parking space size availability, rather than just space availability alone, thus permitting greater efficiency overall for length of street within which unmarked parking locations are available. Another advantage of this system is the potential to compensate for parking impediments thereby providing greater overall reliability to drivers. Yet another advantage of this system is the capability of coupling the space determination method to a proper charging program so as to permit proper and effective revenue generation in relation to space usage. Still another advantage of this inventive system is the ability to communicate such notifications remotely via a robust up-to-date computer program to individual drivers, or, alternatively, via on-street displays. Furthermore, the ability to provide all of these aforementioned advantages as well as the capability to reduce total fuel-burning emissions from numerous vehicles remaining in operation searching for proper on-street parking locations through the implementation and utilization of a properly configured notification system to alert such drivers to nearby parking availability, accords yet another advantage.

Accordingly, this invention encompasses a parking notification system for on-street unmarked locations, wherein said street includes a substantially straight curb for end-to-end vehicle parking to occur, said system comprising a plurality of sensors present a pre-selected distance from one another and aligned in parallel arrangement with said curb of said street, wherein said sensors include at least two different notification means to indicate the presence of an object within a proximal distance therefrom through at least one signal generated thereby, wherein upon generation of at least one signal from said sensors notification of such an object presence event transfers data to a central database to indicate a time stamp memorializing such an event; wherein said system thus translates the data from said sensors to create a reportable diagnostic as to the remaining space available for further parking within the unmarked on-street configuration subsequent to the presence of said object; wherein said system thus allows for continued updating of available space along said on-street location in terms of actual sizes for assessment of specific vehicle capability; and wherein said system employs a notification protocol through wireless means to a target driver as to the updated availability of unmarked parking space along said on-street location. Such a system further allows for metering of time in terms of permitting parking charges without the need for in-person monitoring. Furthermore, this invention encompasses the algorithm that accords such sensor reading and transmission capabilities for such reliable and proper driver notification and continued metering actions to occur. Such an algorithm basically accords sensor reading and transmission capabilities in relation to the system as described above, including the steps of: a) sensing an initial object presence through notification of such an event by the activation of at least one of said notification means present within said sensors; b) providing a prolonged object presence determination after at least 5 seconds have elapsed since said initial object presence is provided in step "a" thereby generating a signal indicating continued object presence in relation to said sensor indicating such a prolonged object presence; c) transmitting such a prolonged object presence indication signal to said central database; d) activating a software program within said central database indicating the reliability of the signal of step "c"; and e) generating a time-stamp memorializing the time at which said prolonged object presence indication signal of step "c" is generated in relation to the specific sensor activated in such a manner. Furthermore, the algorithm would be followed in terms of these process steps "a" through "e" by any number of sensors present within said system that are proximally located to an object present therein such that said step "e" generates a time-stamp in relation to all such sensors generating a prolonged object presence indication signal substantially simultaneously and transmitted to said central database, thereby indicating the presence of an object of certain length within the space within the on-street parking system. As well, such an algorithm would indicate, upon the evacuation of an object from the proximal vicinity of a sensor, activation of notification means to indicate the movement of an object out of said space within the on-street parking system such that a signal is transmitted to said central database to generate a time-stamp memorializing such an space evacuation event; and wherein said central database further generates a notification signal in relation to said space evacuation event sensor activation to the extent that the previously filled spaced within the on-street parking system is now available. Such a system and algorithm within such a system are described in greater detail below.

Thus, in essence, certain embodiments of the present invention are directed to an intelligent parking system for on-street parking comprising a set length of available parking space with embedded sensors spaced a certain distance apart within the actual asphalt of the street. Such embedded sensors provide reliable readings as to the presence of an object above such sensors, with readings taken every few seconds to account for long-term presence, rather than temporary presence, of a vehicle. With set intervals of such sensors in place, the overall system thus permits reliable indications as to specific vehicle lengths that are in place over the entirety of the available on-street parking spaces in real time. In that manner, the sensors may thus provide suitable indications as to remaining available parking space along the target street. Additionally, such sensor technology may serve as a proper platform to also act as a revenue generating system by indicating to a central location the utilization of available on-street parking space for a certain amount of time, coupled to a charging system to allow for payments to be made in accordance with some space utilization.

Such sensors may be of any type that allows for proper object detection and that may properly transfer signals indicating object presence in a wireless configuration. Upon object sensing, a signal is generated, possibly, though not necessarily, coupled to other signals of adjacent sensors, to a central server to distinguish vehicle size and presence, as needed. As well, such sensors may be properly configured to allow for proper account of locations on a street that do not permit parking of a vehicle. Thus, a sensor (or more than one sensor) may be embedded in relation to a fire hydrant location (or a driveway location, as examples) that will always indicate such a requirement. As a result, if desired, such a sensor may also provide an indication as to the presence of a vehicle illegally parked in such a manner, allowing for signal transfer of such a result to a central location so as to permit proper authorities to handle such a situation accordingly.

The nature of such sensors, coupled with the inventive algorithm noted in greater detail below, accords a proper assessment of the overall parking alignment and positioning of vehicles in an end-to-end fashion, thus permitting proper space usage (and thus overall efficient utilization of available space for parking) along an unmarked street. Such sensors, as alluded to above, would preferably include two distinct and different object sensing processes included therein. Such dual (or greater) capability permits the overall system greater reliability, particularly if one sensor type (for example, an infrared sensor) cannot function as intended due to, for instance, weather conditions (for example, if snow covers the sensors, such infrared alternatives may not provide an effective indication as to object presence). A second, at least, sensor component, for instance, and without limitation, a magnetic sensor, may thus provide the needed extra benefit of reliable indication of object presence if weather conditions, again, as merely one example, prevent effective infrared functions at that time. More than one sensor component, then, may be employed if desired. Other types of sensors, as well, may substitute for infrared and/or magnetic sensor types, too. For instance, ultraviolet may be utilized, although infrared is certainly a safer alternative; like wise, electronic breaks may be utilized rather than magnetic types; again, though, magnetic sensors appear to be safer and more reliable. In essence, though, such sensor components, again, may be of any other type that would provide such beneficial indication capabilities.

Although a plurality of such sensors is to be utilized for such a purpose, cost concerns, as well as overall implementation issues, will most likely limit the overall number of evenly spaced sensors to as few as necessary to provide reliable detection readings in this manner. As such, although the system may employ as many sensors as desired (and, certainly, for reliability purposes, the greater the number of spaced sensors, the better), efficiencies may demand a system that utilizes a minimal number and still accords an acceptable reliability level in terms of proper detection and communication of vehicle sizes present along a specific street in parking fashion (and in spaces that are not previously marked in any manner). As such, the overall system has been developed to generate the necessary reliability levels through the utilization of multiple sensor components in tandem with an inventive algorithm incorporating the data detected by such sensors. As noted above, one sensor component preferably, though not necessarily, includes a light-sensing technique to provide a certain degree of reliability as a light signal would be broken once an object was introduced for a sufficient period of time within the light beam, thus triggering the sensor to such a degree. Infrared technology is particularly preferred for such an initial phase procedure, allowing for detection of infrared signals generated by the sensor and returned after reflection from the targeted object. The second sensor type is completely separate from the first and relies, similarly, upon the static placement of an object within its proximal vicinity to trigger notification of an object presence. A magnetic signal provides greater variability than a light-sensing component, particularly, as noted previously, if weather conditions effect the reliability of light signals to provide effective indications (i.e., if the total sensor is covered with snow, the light signal will constantly indication object presence). As such, although the sensor types are considered separate and distinct, in practice, such a configuration may work in tandem, if needed, to ensure proper indication of object presence through a check of both sensor components; if one signals object presence while the other does not, the system may compensate, through the necessary algorithm, to provide the correct indication result. Thus, in any type of situation, data transfer from either sensor component will not indicate some type of object presence; with both activated, object presence is easily clarified. With only one activated, the system will, again, check in combination with the algorithm to ensure proper object presence is indicated. Likewise, if the sensor trigger is fleeting, and thus not "permanent" (or not established for more than 30 seconds, for example), then the indication will be removed and no time stamp of object presence will be recorded. This failsafe mechanism thus ensures that the parked object is, in actuality, a non-moving vehicle, rather than a person or temporary object standing close enough to the sensors to create a signal trigger. As such, the concatenation of the two phase signals of the sensor thus allows for a reliable reading in terms of actual object detection that may subsequently be coupled with readings from other sensors to generate a proper overall signal of vehicle presence, and, more succinctly, assess a specific time when such a parked object of a specific size (taking into account the specific sensors that have been tripped and their spatial relation to one another in order to correlate such distance deductions to a specific vehicle size) has been parked. Thus, upon creating an updated inventory of filled and open space along the street in question, the system may then generate a reading of such information for further communication to inquisitive drivers through any such available means (as discussed herein).

More importantly, however, than the presence of sensors for such results, is the utilization of a proper algorithm to provide these signals and, ultimately, complete information as to on-street parking space utilization. The inventive algorithm thus receives the detection readings from the sensors in question and provides the necessary assessment as to actual object presence, time in, time out, and, ultimately, object size, to, again, provide specific space availability to potential parking drivers on demand and up-to-date.

As further discussed herein, the overall system employing such sensors and the inventive algorithm may further provide a reliable system to accord metering potential in order to provide an effective and efficient revenue stream, should the need arise. As alluded to previously, the overall configuration of a marked-space on-street system is rather limiting when it comes to actual space utilization and, as a result, capacity for metering revenue generation. Furthermore, the systems currently in place are rather simple in that a sensor for a marked space may easily trigger time-in and time-out readings in that respect. The problems inherent with unmarked spaces create far greater concerns, although the overall configuration will permit greater use of parking space resources for, theoretically, at least, more efficient use of space within a limited area. The system described above, utilizing dual-phase sensors with an algorithm that accords proper assessment and detection of specifically sized vehicles at specific times, thus may translate into a method of providing effective metering capabilities as well. A driver may park along a curb, thus triggering specific sensors to the degree necessary to alert the database, etc., at issue of the specific vehicle size being present at a specific time. Upon leaving, the sensors will likewise notify the database, etc., of such a fact, thus allowing for a driver to rely upon the system itself to calculate parking times and, ultimately, metering charges.

Although revenue generation may be one aspect of this invention, in actuality, the key issue is efficient use of information to reduce the necessity of drivers to traverse again and again a certain range of potential parking spaces to its bare minimum. In such a manner, the main benefit is the reduction of cumulative vehicle emissions through the limit of time needed for a driver to find a desirable parking space in an on-street arrangement. Such reliable notifications of such information may thus reduce driving times (particularly if a driver knows far enough in advance of the location of ample numbers and/or sizes of spaces) to allow for lower emissions.

In particular embodiments, the on-street parking space availability identifier data revealing available spaces can be transmitted to drivers desiring a parking space before they arrive at the street in question, or even beforehand (although the closer to such a location the better as another driver may have located such available space while the other is in transit). Such notifications may be made using an external fixed display (again, more suitably on a street-by-street basis) and/or a pervasive computing or mobile communication device, such as a wireless communication device, a laptop computer, a PDA, iPhone, Blackberry device, palm pilot or other device such as those that may be integrated in the vehicle itself (GPS device, for instance). In certain embodiments, the available parking spaces can be provided in a map grid display for visual graphic presentation of open or available space and/or as a textual summary of available space along a target street.

In particular embodiments, the map or grid of available spaces may be relayed to a computer network such as to a web page on an internet site that can be accessed by users on individual communication devices and/or relayed to desired regional or localized driver-visible display panels positioned at desired regions about the parking lot or on access roads proximate thereto. The map can be updated in substantially real time so that a user can visually identify open or available spaces as he/she approaches the street as well.

In other embodiments, the space specific data can be generated over a conventional radio in the vehicle. The available space location data can be provided using an automated voice translation system that converts digital space data to a verbal message that can be transmitted over a predetermined radio channel, thereby directing the driver of a vehicle to a street with suitable available space for his or her vehicle. Additionally, the notification system may be provided through a global positioning system (GPS) with a visual or verbal interface with a driver and/or passenger. In any event, the capability of providing individual notifications (further possibly included SmartPhone technology or other mobile device utilizing a web browser of through on-line applications with constant notification updates) may be of any configuration to permit continuous updates of such information.

The system can also be configured to exclude parking spaces from the spaces identified as available for those spaces that are impermissible due to fire hydrant, driveway, or other hindrance being presence, or, as well, the sensors may be configured to notify the driver as to street repairs in the available space area that may impede any parking potential at that specific time.

DETAILED DESCRIPTION OF THE PREFERRED EMBODIMENTS AND THE DRAWINGS

The present invention will now be described more fully hereinafter with reference to the accompanying figures, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. In the drawings, layers, regions, or components may be exaggerated for clarity. In the figures, broken lines indicate optional features unless described otherwise. The method steps are not limited to the order in which they are set forth.

Generally stated, embodiments of the present invention provide intelligent on-street parking systems that can assess the availability and identify the location of the available individual parking spaces along a street. The term "on-street parking" includes any stretch of a street within which vehicle parking in end-to-end fashion is permitted. The present invention may be particularly suitable for urban centers with large commuter populations that, and including a large capacity of on-street parking without any pre-marked or delineated parking spaces for vehicles. The on-street parking spaces may thus be available for cars (of all sizes), trucks, buses, vans, motorcycles, bicycles or any other type of motorized or non-motorized object capable of using a parking space. The term "object detector" is used interchangeably with the term "object sensor."

As will be appreciated by one of skill in the art, the present invention may be embodied as a system, method, data processing system, and/or computer program product. Accordingly, the present invention may take the form of an entirely hardware embodiment, an entirely software embodiment or an embodiment combining software and hardware aspects, which may all generally be referred to herein as a "network" Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as, but not limited to, Java, Smalltalk or C++. However, the computer program code for carrying out operations of the present invention may also be written in conventional procedural programming languages, such as the "C" programming language. The program code may execute entirely on a computer associated with the on-street parking system, as a stand-alone software package, partly on a central parking system computer(s), partly on a user's computer and partly on a remote computer or entirely on the remote computer. In the latter scenario, the remote computer may be connected to the parking lot and/or user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

Figure 1:
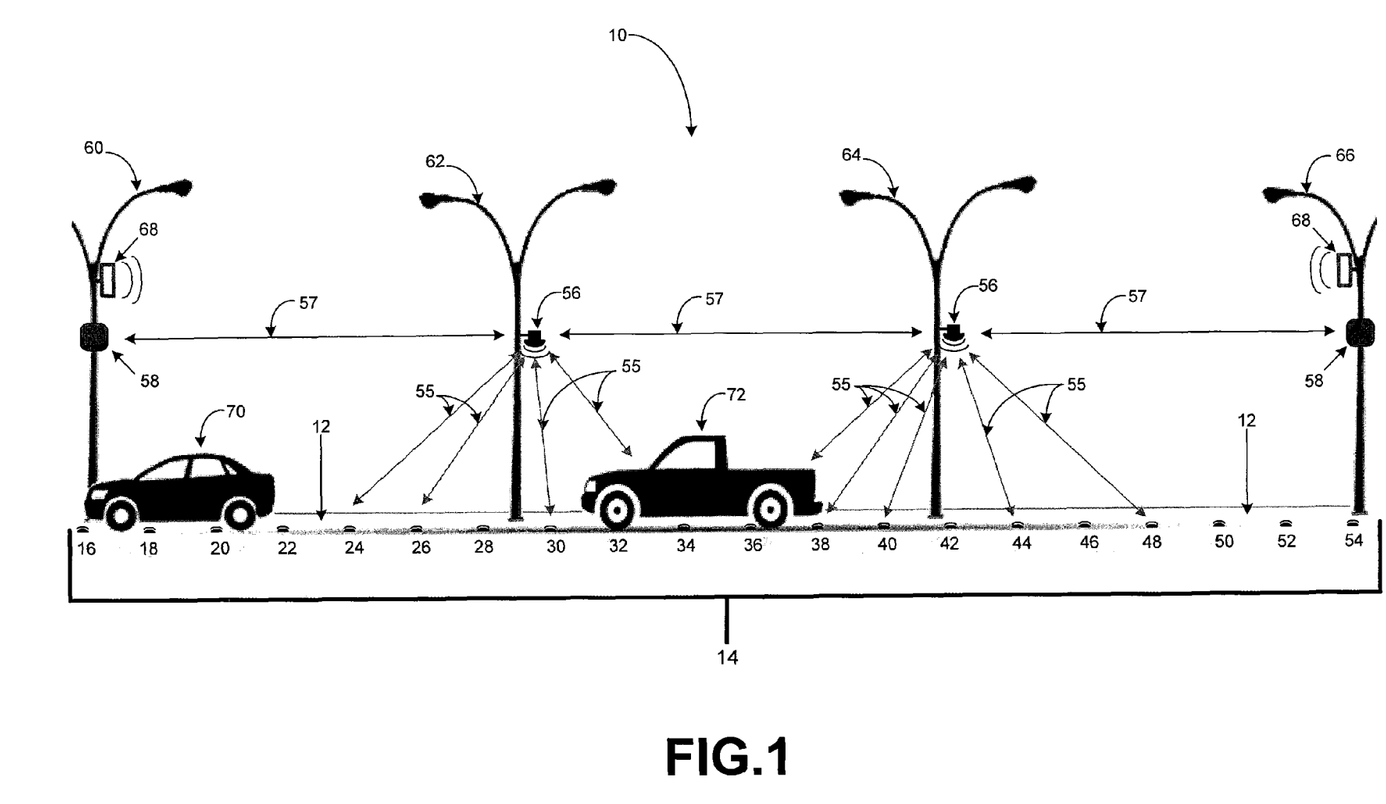
FIG. 1 is a schematic illustration of an intelligent parking system according to embodiments of the present invention showing a length of unmarked spaces along a street with a number of vehicles already present with a certain amount of space available for another vehicle to park.

FIG. 1 illustrates the on-street operation involving unmarked spaces and the capability of sensing vehicle sizes and parking times. In this specific situation (which, it should be evident, is but one possible scenario as the arrangement of vehicles along a street without any marked parking spaces is fluid and the overall introduction and departure of vehicles is dynamic throughout any time period; thus, thus series of figures is simply provided to show one possible instance of a parking event within the metes and bounds of the invention), a parking system 10 is provided with a curb 12 (although, if a curb is not physically present, some boundary of a type that indicates the extent of movement and placement of a vehicle is in place, nonetheless as an equivalent thereto) and a street 14. The street 14 includes a series of embedded sensors 16, 18, 20, 22, 24, 26, 28, 30, 32, 34, 36, 38, 40, 42, 44, 46, 48, 50, 52, 54 spaced substantially uniformly apart (here in a configuration of 3 sensors for every twenty feet of street 14 in parallel with the curb 12, spaced from roughly 1½ to 4 feet, preferably about 3 feet, from the curb 14, as well), with each sensor 16, 18, 20, 22, 24, 26 28, 30, 32, 34, 36, 38, 40, 42, 44, 46, 48, 50, 52, 54 including two distinct indicator components (not illustrated), here an infrared detector component and a magnetic detector component (neither illustrated). The infrared detector continuously emanates an invisible light signal until such is reflected back denoting the presence of an object within the sensitivity range thereof. In this embodiment, the infrared sensor emits a light impulse generally upward and substantially directly over the sensor itself. In this manner, the impulse may detect a vehicle that is located directly over such a sensor (some variability in the width of the light impulse, as well as basic direction to which such a light impulse is pointed may also be employed, if desired). Likewise, within this potentially preferred embodiment, the magnetic sensor is always active, measuring disturbances in reference to the earth magnetic field. Once a change over a certain level takes place the magnetic sensor will send an event message to the back end system which is tied to its internal number and location as defined in the back-end database. Thus, the IR sensor, co-located with the magnetic sensor will constantly emit a beam. Once an object blocks the beam a return signal will be reflected to the IR sensors optical receiver. If both the magnetic sensor and the IR sensor show a change in or about the same time frame, they are referenced against each other to determine any object presence at a higher degree of accuracy than magnetic sensing alone. As alluded to above, if the IR becomes blocked for an extensive period of time (weather problems, loss of power, etc.) but the magnetic sensor shows no change the system will determine that the IR is dysfunctional and will revert to magnetic sensing only until such time that the IR transmitter/receiver is cleared. As such, although magnetic sensing alone may be more prone to error reads to a greater degree, in actuality, such a sensor component will still perform at a very high level, and at least one sufficiently high for proper reliability to be accorded a user.

In FIG. 1, the sensors are configured in such a manner and attuned in wireless fashion to transmit detection information signals 55 to a relay 56 which then transfers the detection signal 57 to a recordation device 58, both of which, in this specific potentially preferred embodiment, are present on light poles 60, 62, 64, 66 proximally located to the sensors 16, 18, 20, 22, 24, 26, 28, 30, 32, 34, 36, 38, 40, 42, 44, 46, 48, 50, 52, 54 themselves. The detection signals 55 may thus be sent to the relays 56, with subsequent signals 57 sent to the recordation devices 58 and further relayed off-site by a transmitter 68 to a central recording location (not illustrated) to provide an inventory record in relation to the overall sensor detection readings, particularly in a continuous manner to reflect the on-time actual status of available parking space in this unmarked on-street configuration. Two vehicles 70, 72 are already present in this situation (again, any configuration of vehicle spacing, etc., may be undertaken within this overall parking system) with the first vehicle 70 detected, in essence, through infrared and magnetic circuitry (not illustrated) via three sensors 16, 18, 20 to provide a proper status update in terms of available space adjacent thereto. The second vehicle 72 thus is detected via four sensors 32, 34, 36, 38, leaving space availability indicated through inactivation of multiple sensors 22, 24, 26, 28, 30 in one location between the two vehicles 70, 72, and another set of multiple inactivated sensors 40, 42, 44, 46, 48, 50, 52, 54 on the rear side of the second vehicle 72. Such an availability result may thus be translated via the lack of sensor tripping through these inactivated sensors 22, 24, 26, 28 and 40, 42, 44, 46, 48, 50, 52, 54 with such signals 55 transmitted to the relay 56 through a second transmission 57 to the recordation device 58 and to a transmitter 68 to a central recording/transmitting location (not illustrated). At that point, the information is condensed and interpreted at the recording location to show vacant space is available for parking and the information may then be supplied through wireless devices, GPS devices, or signage, as needed. Such notifications thus alert a driver of the current space availability status at this specific on-street location in terms of space vacancy as well size limitations for the driver to assess the potential for his or her vehicle meeting such criteria. Such size determinations are permitted through the measurement derived from the inactive sensor signals as to the lack of any present object at those specific locations. Coupled with the actual street location, as well as the on-street location and size information, a driver may thus be provided effective estimates for such an updated assessment of parking capability to be made in real-time, specifically for a system without any marked spaces at all.

Figure 2:
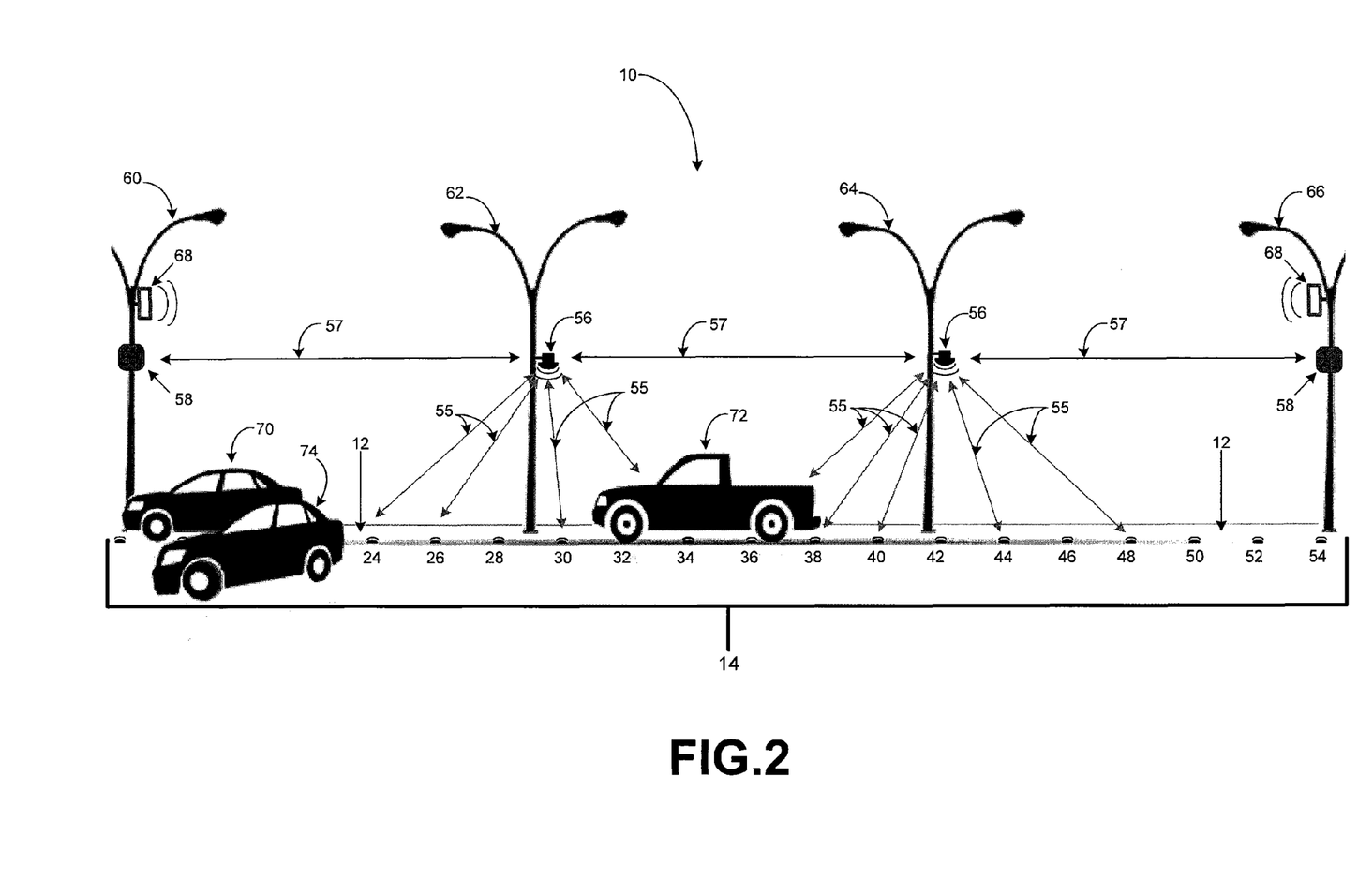
FIG. 2 is a schematic illustration as in FIG. 1 showing a vehicle entering an unmarked parking space and initializing operation of sensors present therein.
Figure 3:
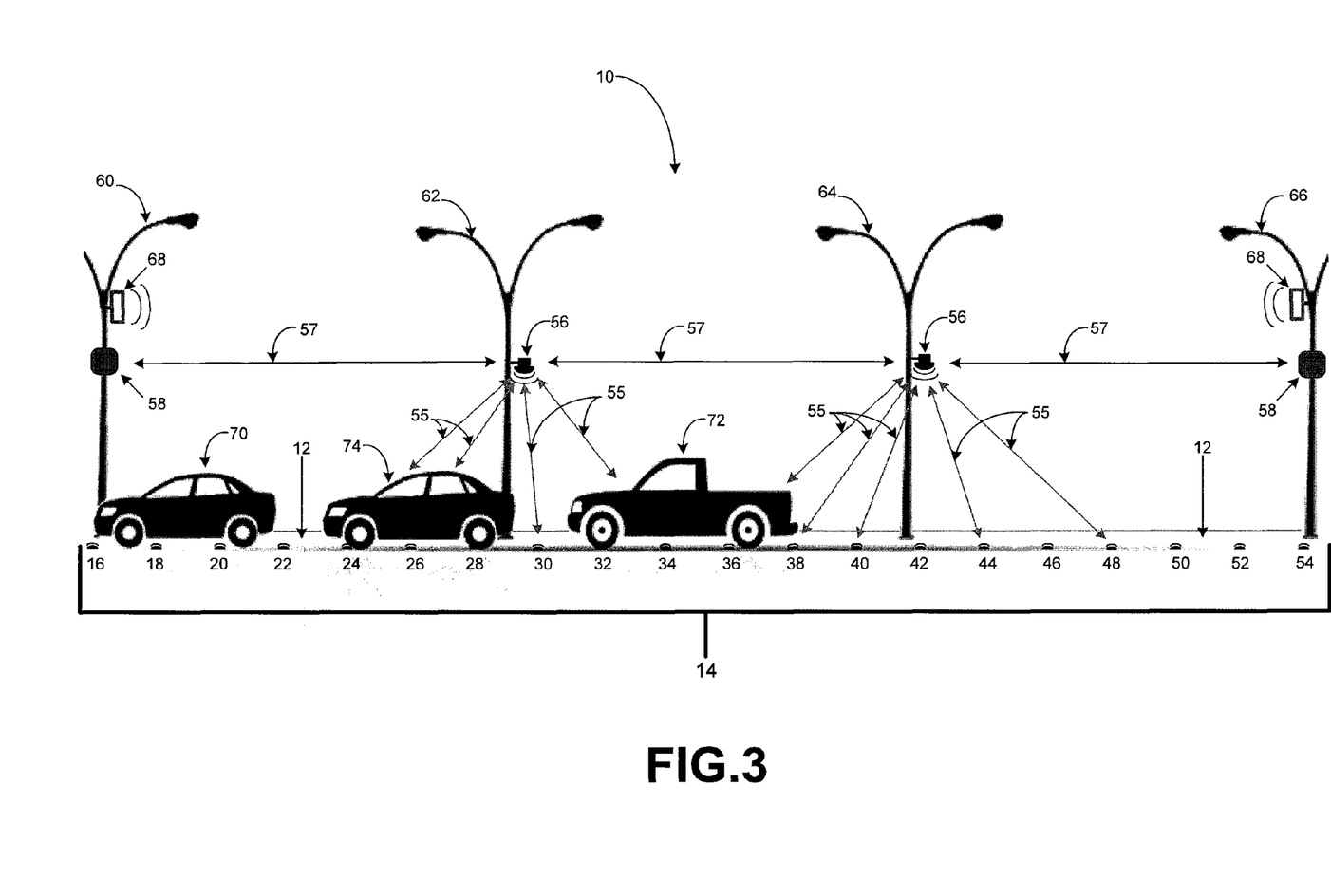
FIG. 3 is a schematic illustration as in FIG. 2 showing a vehicle parking within an unmarked parking space and continuing operation of sensors present therein.

FIGS. 2 and 3 thus show the same general situation as in FIG. 1, but with a parking vehicle 74 first finding (FIG. 2) and, ultimately, parking (FIG. 3) within the available space denoted by unactivated sensors 24, 26, 28 and previously activated sensors 16, 18, 20, 22, 32, 34, 36, 38 providing effective and reliable space availability for such a parking event to occur. In FIG. 2, upon initiating ingress in parallel-parking fashion, the third vehicle 74 will initially trip the magnetic sensor component (not illustrated) of two sensors 24, 26, 28, 30 during its movement. Until it is situated within the final confines of the available parking space, however, the infrared components (not illustrated) of the same sensors 24, 26, 28, 30 will not activate, thus not providing a "final" detection presence to the relay 52 and then to the recordation device 54 related to such sensors 24, 26, 28, 30. As is noticed, however, in FIG. 3, activated sensors 24, 26, 28 will provide an object presence signal 55 to the relay 52 and onward; in actuality, although during a parking event the remaining inactive sensor 30 may initially trip due to temporary object presence as the vehicle 74 moves into parallel position with the curb 12, ultimately any signal will be broken from that sensor 30, leaving the determination of object presence as vacant in relation to that specific sensor 30. Thus, in practice, and for this particular and potentially preferred embodiment of the overall system, the pertinent magnetic sensor component of any of the sensors 16, 18, 20, 22, 24, 26, 28, 30, 32, 34, 36, 38, 40, 42, 44, 46, 48, 52, 54 will provide an initial record of the object presence event, albeit at a lower level of reliability than for an infrared sensor. If the infrared component does not provide a signal thereafter, the systems diagnostics software will initially show the infrared component as inactive, thus generating the post of an error flag. The system management software can thus be set to either record or not record the event with a default setting to record the parking event regardless of the infrared signal status (again, this especially important in areas that are prone to snow conditions). During a parking event, then, the magnetic sensor will trip (such as for the FIG. 2 situation wherein a vehicle 74 is entering an available amount of space along an unmarked street 14), once an object is within proper distance to activate the magnet. The infrared component will likewise activate upon presence of an object. However, if the object does not remain in the specific location associated with that particular sensor (such as sensor 30, for example), then the algorithm will take the temporary presence into account as final object presence determination is made at the recording/transmitting station (not illustrated). Thus, in FIG. 3, after the parking vehicle 74 has parked, the inactivated sensor 30 will transmit no signal of the presence of an object. Utilizing all of the object presence indications from the activated sensors 16, 18, 20, 22, 24, 26, 28, 32, 34, 36, 38 and the inactivated sensors 30, 40, 42, 44, 46, 48, 50, 52, 54, the system, through the algorithm in conjunction with the sensors, can then indicate through a proper time-stamp that an object of a specific size (in this case, the third vehicle 74) is now present within the previously available space between other objects (first and second vehicles 70, 72) and in relation to the activated sensors 22, 24, 26, 28. The available space indicated by inactivated sensor 30 would thus be relayed to any drivers through the system to show that insufficient space for parking is available at that location. Once a vehicle then departs from such a space, the magnetic sensor will indicate withdrawal of an object and the infrared sensor component will not measure a reflected light impulse. Thus, upon such a departure, the sensors will relay signal information 55 to the effect that no object is present to the relay 56 and through another signal 57 to the recordation devices 58, onward to a transmitter 68, and ultimately to a recording/transmitting center (not illustrated) that may thereby create a time-stamp that the prior vehicle has left the space it one filled.

The unique capability of such a system lies in the capability of the sensors to account for not just the presence of any object, but the continued presence of such an object for a significant period of time. The algorithm (and thus the back-end software) accounts for any discrepancies in relation to the reliability of the sensor signals. Filtering of sensor indications as well as ultimate decision-making in terms of recording and then time-stamping such an event is thus left with such an algorithm based upon the single or dual parameters provided by such sensors in a wireless configuration. Thus, the overall effect is accorded by the combination of such sensors properly placed and spaced within a target on-street stretch with the properly attenuated algorithm. Vehicle size and long-term (rather than fleeting) presence can thus be generated to a very high reliability level that may then be transmitted as definitive information to a driver, board, etc., on demand.

Furthermore, such a multiple sensor system may be configured through the presence of extra sensors to accord even greater reliability, although costs may increase simultaneously. For instance, a typical design may utilize three sensors for every 20 feet of available space; if six sensors were introduced within the same range, theoretically, at least greater reliability in terms of actual vehicle length determinations may be possible. Additionally, the potential may exist for infrared or other light impulse sensors to be configured for a rather broad array width to read, again, potentially, extended distances from the sensor itself. Likewise, each sensor may include more than one infrared sensor component directed at an angle to account for possible distance measurements from the sensor itself. In essence, the capability of utilizing any such sensor technology in tandem with the inventive algorithm may accord even greater degrees of reliability in terms of the notification system.

Of course, such a system may also be employed with a marked parking configuration or, more particularly, a possible situation wherein the configuration includes a combination of marked and unmarked spaces. The multiple component sensors would promote the unmarked space benefits as noted above to provide proper time-stamping for monitoring and notification purposes, at least, as well as allow for proper marked space results for such a simplified arrangement. In other words, such sensors will function in either situation, since marked spaces are relatively easy to operate in this manner, albeit through the mere notification that a space is open, rather than the necessity of indicating actual available parking space size.

As such, although the utilization of a such multiple component sensors is of great importance to the overall inventive system, the combination of such a base sensor platform with a properly operated algorithm for information retrieval and utilization, and ultimate driver notification, allows for effective implementation of such a reliable notification system for unmarked on-street parking configurations. In essence, the generation of consecutive (reliable) time stamps of object presence (vehicle) events provided through such sensor notifications, and wherein such sensors are properly grouped together and activated at or about the same time is key to this overall invention. Such sensors merely denote object presence; taking each individual sensor's indications and distilling such information through the utilization of the inventive algorithm thus accords the overall reliability and capability of the system to permit on-street unmarked parking space notifications on demand.

Figure 4:
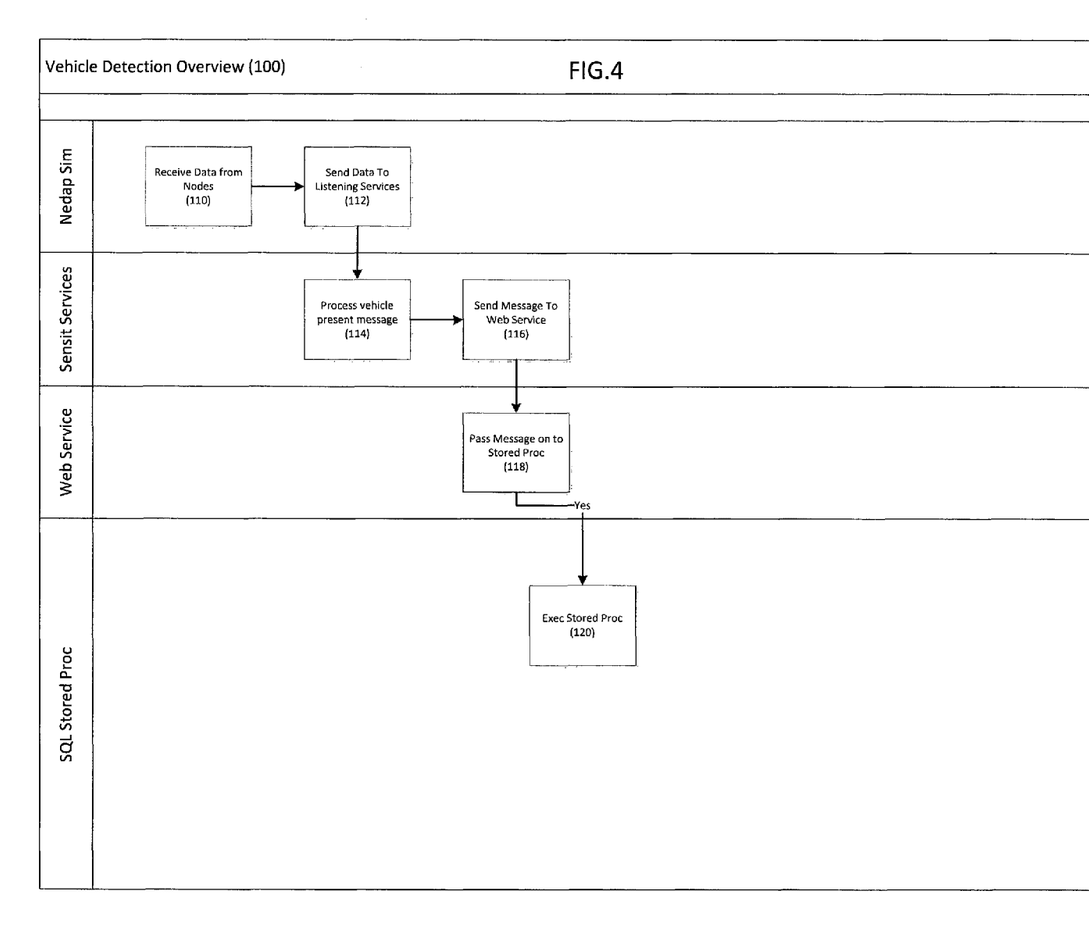
FIG. 4 is an overarching flow chart of operations that can be carried out according to embodiments of the present invention.
Figure 5:
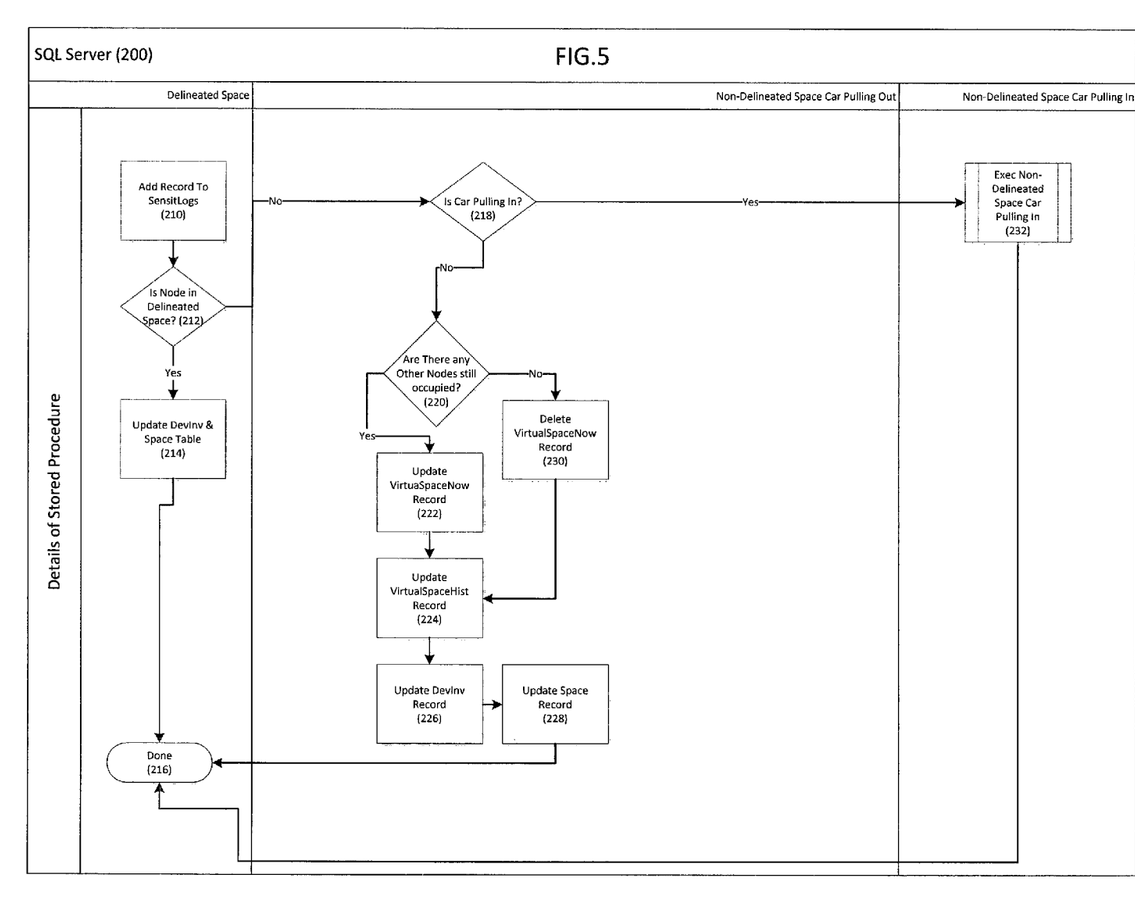
FIG. 5 is a further flow chart of sub-operations of the process in FIG. 4 that can be carried out according to embodiments of the present invention in terms of specific space availability within an on-street unmarked parking configuration.
Figure 6:
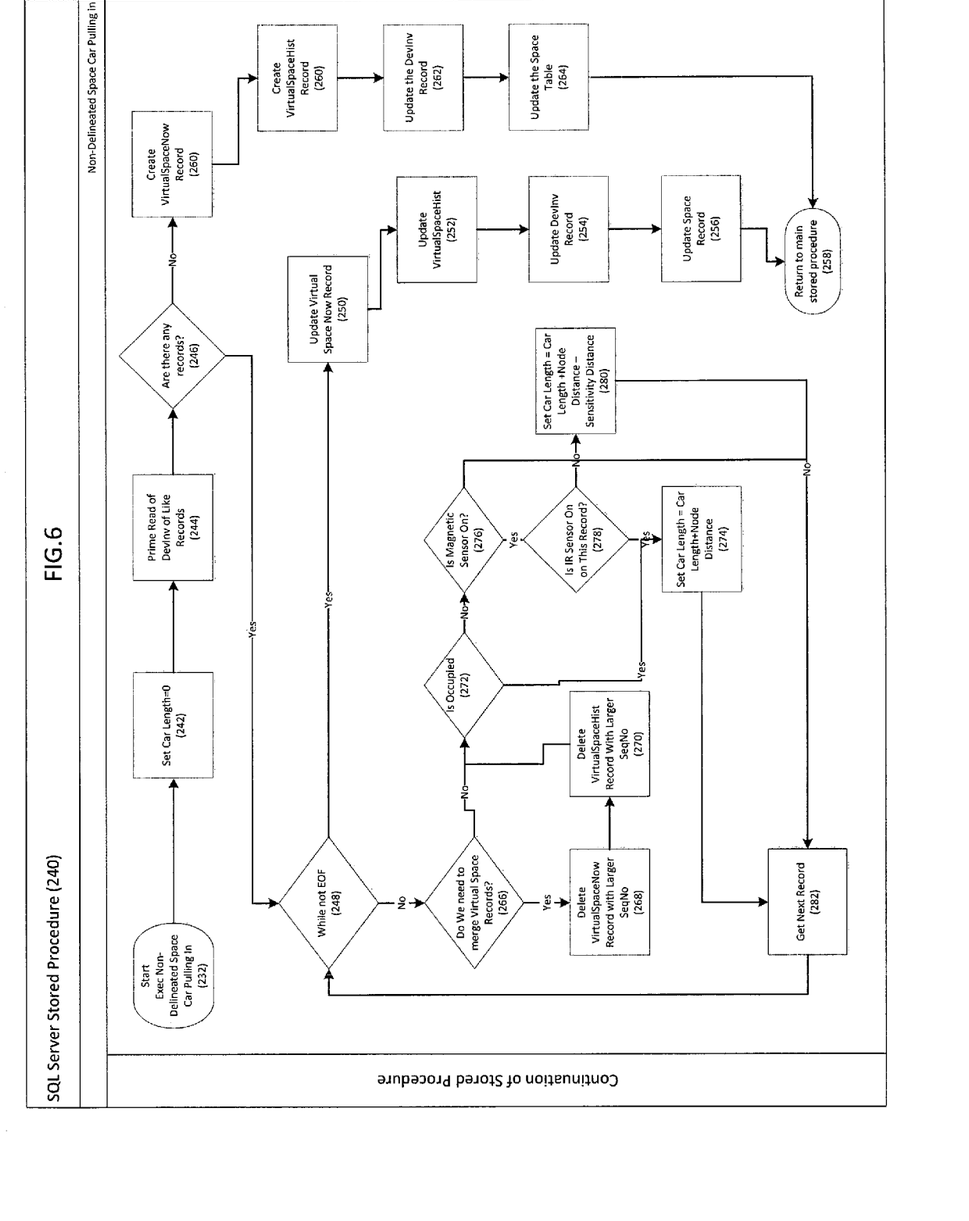
FIG. 6 is a further sub-operation flow chart a portion of the procedure in FIG. 5 showing one embodiment of the notification capability in terms of parking space size in correlation with vehicle size.

Thus, FIGS. 4, 5 and 6 provide a proper description of one such overarching algorithm embodiment to that effect, with FIG. 4 indicating the broad system that includes the algorithm at issue. This broad system 100 includes the receipt of information from the sensors (nodes) 110 and transmission of such information to listening services 112 (i.e., the central location for compilation and presentment of such information). From there, such information is processed in terms of vehicle presence and size 114, then on to a web service 116, for passing on the message of such information to a storage device 118, and executing such a storage procedure 120 for ultimate sharing in a web-based environment.

Breaking down such an overarching system 100, the sub-operation of FIG. 5 shows the inner workings of the notification platform 200. In a hybrid marked/unmarked on-street parking scenario (as one possible situation, of course; this embodiment covers such a potential situation, as the ordinarily skilled artisan would fully comprehend that if a fully unmarked scenario is employed would merely include removal of the possibility of any consideration of a marked space issue, or, in actuality, simple no answers to such flow chart questions), an initial question concerns whether the spaces involved are marked or unmarked 210. If so, the space table within the overall system 210 will indicate if delineation is present or not (present, 212; not, move to 218). If delineation of spaces is present, then the space table will update the system 200 to reflect that the space (device inventory) table is now updated with values returned from the sensor to that effect. In other words, if the space is occupied, the sensors will properly indicate an object is present, through the initial trip of the magnetic sensor and then the possible activation of the infrared sensor, as well. Once an object presence determination has been made by the sensors, such information is transmitted via a signal to the recordation device (54 of FIG. 1) and then to the central recordation system (not illustrated). At that point, the software notes the reliable nature of the information and a time-stamp is generated within the inventory table to that effect. At that point, the notification system is in place and the operation is concluded 216. However, if the system is pertaining to unmarked spaces, the system 200 detects whether a vehicle is pulling into or out of an available unmarked space 218. Such a determination is made through checking three separate flags from a pertinent sensor in relation to the status of the device inventory table itself; if no device inventory is noted, and the sensors indicating nothing is present through such a triplicate presentment, then it is properly indicated that a vehicle is entering the space in question 232; if, to the contrary, the sensors show an object has been present and that meets the device inventory table status, then any movement with regard to such sensors will indicate the vehicle is leaving the space 220. If the vehicle is departing a space, then the system further considers whether any other sensors (nodes) are still occupied in the general vicinity after departure 220. In general, the sensor will provide the necessary information whether a detected object has already left or has remained present until such movement begins. If so, then a virtual space record is updated 222 (reflecting the retention of detection signals adjacent to the sensors at issue that or on record as indicating object presence), followed by the updating of the specific sensor history 224 to reflect the time-stamp pertaining to the prior present object. The system thus will consider is the previous time-stamp is null or not, and update the stamp to note that the vehicle is leaving, thus ending the stamp duration at that moment. As a result, the resultant effect leads to the proper updating of the actual device inventory record 226 through the infrared and magnetic sensor component detection capabilities and results, thus removing the occupied status for the specific sensor at issue. The device inventory table is thus updated to reflect these issues as a result. In the event, however, that no other sensors are marked as occupied in the general vicinity 220, then the system 200 skips directly to the history update record step 224 and onward. At that point, in either alternative, the space record in relation to the inventory of available space is updated 228 to indicate the actual status of available unmarked space remaining available after such a vehicle is present and the overall information is updated to that effect. A time-stamp is then generated showing departure and the process is concluded 216 until another vehicle seeks ingress into the specific available unmarked space.

If, however, a vehicle is pulling into an unmarked available space, 232, a further sub-operation is undertaken, shown within FIG. 6. This sub-operation 240 thus first indicates through the activation of the initial phases of sensors (infrared, as one example) that such an action is occurring 232, and initially setting the vehicle length at zero in terms of the activated sensor 240. From that point, the system 240 considers if any like inventory records in terms of the actual initially activated sensor are already in place on the updated table 244. To that end, the comparison may be made in relation to the number of sensors within a certain number of positions of the parking object (i.e., reflecting the measurement of distance due to infrared, etc., emission sensitivity, for instance), thus providing a notification to the central recording location that a time-stamp may then be created (or completed) within a certain timeframe in relation to such vehicle's movement within the identified space ceasing. The record comparison 246 then concerns whether any objects are present 248 or not 260. If records are present on the inventory table that match the selected criteria with regard to the sensors at issue, then an assessment of the time-stamp file status is made for the sensor(s) in question 248. If the status has been properly updated 250, then the system 240 is properly updated to reflect the vehicle size and the time-stamp end for the parking space in question. From that point, the system 240 basically follows the same steps denoted by 22, 224, 226, and 228 in FIG. 5. However, if the file has not properly ended with the time-stamp information 266, then further considerations are undertaken to assess the overall situation. For instance, there is a possibility that the sensors provide detection information that create to different space records because of the lack of communication between such nodes that a single parking event has occurred. Such an occurrence could happen if a fourth sensor and a first sensor (in a series, for instance) (such as, for example, sensors 16 and 22 in FIG. 1) are activated, but it is unclear that such activation pertains to a single event until sensors 2 and 3 in the series (such as sensors 18 and 20 of FIG. 1, again, for example) provide the same message. In order to compensate for any lag time, then, the algorithm 240 (system) allows for merging of virtual space records 268 to make a reliable assessment in real-time. The allowance for larger sequence numbers can then update the virtual space record in such a real-time capability, followed by an update of the virtual space history 270 of the same information. If no merger of information is needed, then the system 240 will inquire as to whether the space in question is now occupied 272 through activation of all sensor components (which clearly is the further step subsequent to the space history update in virtual time 270 as well). If so, the system 240 will then move on to measure the car length through the sensors per the usual method 274, basically noting the actual presence in relation to the sensors as well as adding the distance indicated from adjacent sensors of object presence through the sensitivity capability of such mechanisms. However, if the sensors do not fully indicate that a space is properly occupied the system 240 will try to determine if the magnetic sensor is actually turned on initially 276. If not, then the system 240 will inquire as to the reason for inactivation or inactivity of the magnetic sensor; if it is, then the infrared sensor component is reviewed for inactivation or inactivity 278. If both are properly functioning, then the system 240 overrides any discrepancies and records the necessary measurements of length, etc., as in step 274, described above. If the magnetic sensor records a present object, but the infrared sensor does not, thus indicating a space as unoccupied, then the system 240 overrides the infrared limitation and relies upon the magnetic sensor readings 280. In that manner, the magnetic measurements provides the necessary car length particulars in relation to each activated sensor in relation to that parking event, reducing the overall measurement by the magnetic sensitivity results to provide a reliable car length result. From that point, a further record can then be established for the space in question 282.

Alternatively, to the assessment if no records have been found for the sensors/space at issue within the updated inventory table 246, a new virtual space record can be initiated 260, but only if such an event is the first message received from the sensor in question for the timeframe involved. At that point, the further steps 260, 262, 264, mirror those of 252, 254, and 256, leading to a return to the main procedure of the overall system 200.

As noted above, the system may be configured to wirelessly communicate between all transmission components, leading all the way to notifications provided to drivers. When no vehicle is present in an available unmarked space, the sensors can be configured to send no signal to the recordation device, and onward to all other receiving modules. When the sensors are activated as noted, a central processor analyzes the signal data and outputs the size and location of the available unmarked on-street parking spaces. The output can be directed to a display sign or board proximate the street in question, or such information may be relayed through wireless communication to a driver's GPS, SmartPhone, or like wireless personal device (or web page, etc.), as described above.

In certain embodiments, the central processor may provide information about the occupied and/or unoccupied or available spaces as web pages that may be predefined and stored at a local device. Such web pages may also be dynamically generated to incorporate substantially real-time parking data. The web pages may be Hypertext Markup Language (HTML) common gateway interface (CGI) web pages. The web pages may also be or include Java scripts, Java applets or the like which may execute at the central processor. As will be appreciated by those of skill in the art, other mechanisms for communicating between a web server and a client may also be utilized. For example, other markup languages, such as Wireless Markup Language (WML) or the like, for communicating between the local processor and the prospective parking lot user using an output display may be used.

In certain embodiments, the overall system can be configured so that the sensors may be selectively activated during peak parking periods and deactivated, placed on stand-by or watchdog mode or be unpolled during lesser traffic periods to reduce power consumption (or, as noted above, can be properly controlled in terms of on-street construction, driveway and/or hydrant presence, and the like).

The I/O data port can be used to transfer information between the data processing system and the global computer system (e.g., the Internet) or another computer system or other device controlled by the processor. These components may be conventional components such as those used in many conventional data processing systems, which may be configured in accordance with the present invention to operate as described herein.

In the drawings and specification, there have been disclosed embodiments of the invention and, although specific terms are employed, they are used in a generic and descriptive sense only and not for purposes of limitation, the scope of the invention being set forth in the following claims. The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A parking notification system to indicate the presence of at least one vehicle in relation to unmarked available parking locations on a street that includes a substantially straight curb for end-to-end vehicle parking to occur; said system comprising a plurality of sensors present a pre-selected distance from one another and aligned in parallel arrangement with said curb of said street, wherein said sensors include at least two different notification means to indicate the presence of a parked object within a proximal distance therefrom through the generation of at least one signal from said sensors; wherein upon generation of said at least one signal from said sensors indicating the presence of an object within a specific length parallel to said substantially straight curb, notification data of such an event is transmitted to a central database to indicate a time stamp memorializing such an event; wherein said system translates the data from said sensors to create a reportable diagnostic as to any remaining space available for further parking within the unmarked on-street configuration subsequent to the presence of said parked object; wherein said system allows for continued updating of available space along said on-street location in terms of actual open space along said substantially straight curb wherein a parked object is not present; and wherein said system employs a notification protocol through wireless means to a target driver as to the updated availability of unmarked parking space along said on-street location.

2. The system of claim 1 wherein said system further allows for metering of time in terms of permitting parking charges without the need for in-person monitoring.

3. The system of claim 2 wherein each of said sensors include a magnetic-based notification means and an infrared-based notification means.

4. The system of claim 2 wherein said sensors are embedded within said street.

5. The system of claim 2 wherein said notification data of an object presence event is accomplished through wireless transmission from at least one of said sensors to a proximally located receiver/transmitting device, and wherein said proximally located receiver transmits such received data to either of said central database or a second receiver/transmitting device for further transmittance to said central database.

6. The system of claim 1 wherein each of said sensors include a magnetic-based notification means and an infrared-based notification means.

7. An algorithm that accords sensor reading and transmission capabilities in relation to the system as described in claim 6, said algorithm including the steps of:

a) sensing an initial object presence through notification of such an event by the activation of at least one of said notification means present within said sensors;
b) providing a prolonged object presence determination after at least 5 seconds have elapsed since said initial object presence is provided in step "a" thereby generating a signal indicating continued object presence in relation to said sensor indicating such a prolonged object presence;
c) transmitting such a prolonged object presence indication signal to said central database;
d) activating a software program within said central database indicating the reliability of the signal of step "c"; and
e) generating a time-stamp memorializing the time at which said prolonged object presence indication signal of step "c" is generated in relation to the specific sensor activated in such a manner.

8. The algorithm of claim 7 wherein said steps "a" through "e" are followed by any number of sensors present within said system that are proximally located to an object present therein such that said step "e" generates a time-stamp in relation to all such sensors generating a prolonged object presence indication signal substantially simultaneously and transmitted to said central database, thereby indicating the presence of an object of certain length within the space within the on-street parking system.

9. The algorithm of claim 7 wherein upon the evacuation of an object from the proximal vicinity of a sensor activates said notification means to indicate the movement of an object out of said space within the on-street parking system such that a signal is transmitted to said central database to generate a time-stamp memorializing such an space evacuation event; and wherein said central database further generates a notification signal in relation to said space evacuation event sensor activation to the extent that the previously filled spaced within the on-street parking system is now available.

10. The system of claim 1 wherein said sensors are embedded within said street.

11. An algorithm that accords sensor reading and transmission capabilities in relation to the system as described in claim 10, said algorithm including the steps of:
a) sensing an initial object presence through notification of such an event by the activation of at least one of said notification means present within said sensors;
b) providing a prolonged object presence determination after at least 5 seconds have elapsed since said initial object presence is provided in step "a" thereby generating a signal indicating continued object presence in relation to said sensor indicating such a prolonged object presence;
c) transmitting such a prolonged object presence indication signal to said central database;
d) activating a software program within said central database indicating the reliability of the signal of step "c"; and
e) generating a time-stamp memorializing the time at which said prolonged object presence indication signal of step "c" is generated in relation to the specific sensor activated in such a manner.

12. The algorithm of claim 11 wherein said steps "a" through "e" are followed by any number of sensors present within said system that are proximally located to an object present therein such that said step "e" generates a time-stamp in relation to all such sensors generating a prolonged object presence indication signal substantially simultaneously and transmitted to said central database, thereby indicating the presence of an object of certain length within the space within the on-street parking system.

13. The algorithm of claim 12 wherein upon the evacuation of an object from the proximal vicinity of a sensor activates said notification means to indicate the movement of an object out of said space within the on-street parking system such that a signal is transmitted to said central database to generate a time-stamp memorializing such an space evacuation event; and wherein said central database further generates a notification signal in relation to said space evacuation event sensor activation to the extent that the previously filled spaced within the on-street parking system is now available.

14. The system of claim 1 wherein said notification data of an object presence event is accomplished through wireless transmission from at least one of said sensors to a proximally located receiver/transmitting device, and wherein said proximally located receiver transmits such received data to either of said central database or a second receiver/transmitting device for further transmittance to said central database.

15. An algorithm that accords sensor reading and transmission capabilities in relation to the system as described in claim 14, said algorithm including the steps of:
a) sensing an initial object presence through notification of such an event by the activation of at least one of said notification means present within said sensors;
b) providing a prolonged object presence determination after at least 5 seconds have elapsed since said initial object presence is provided in step "a" thereby generating a signal indicating continued object presence in relation to said sensor indicating such a prolonged object presence;
c) transmitting such a prolonged object presence indication signal to said central database;
d) activating a software program within said central database indicating the reliability of the signal of step "c"; and
e) generating a time-stamp memorializing the time at which said prolonged object presence indication signal of step "c" is generated in relation to the specific sensor activated in such a manner.

16. The algorithm of claim 15 wherein said steps "a" through "e" are followed by any number of sensors present within said system that are proximally located to an object present therein such that said step "e" generates a time-stamp in relation to all such sensors generating a prolonged object presence indication signal substantially simultaneously and transmitted to said central database, thereby indicating the presence of an object of certain length within the space within the on-street parking system.

17. The algorithm of claim 16 wherein upon the evacuation of an object from the proximal vicinity of a sensor activates said notification means to indicate the movement of an object out of said space within the on-street parking system such that a signal is transmitted to said central database to generate a time-stamp memorializing such an space evacuation event; and wherein said central database further generates a notification signal in relation to said space evacuation event sensor activation to the extent that the previously filled spaced within the on-street parking system is now available.

18. An algorithm that accords sensor reading and transmission capabilities in relation to the system as described in claim 1, said algorithm including the steps of:
a) sensing an initial object presence through notification of such an event by the activation of at least one of said notification means present within said sensors;

b) providing a prolonged object presence determination after at least 5 seconds have elapsed since said initial object presence is provided in step "a" thereby generating a signal indicating continued object presence in relation to said sensor indicating such a prolonged object presence;
c) transmitting such a prolonged object presence indication signal to said central database;
d) activating a software program within said central database indicating the reliability of the signal of step "c"; and
e) generating a time-stamp memorializing the time at which said prolonged object presence indication signal of step "c" is generated in relation to the specific sensor activated in such a manner.

19. The algorithm of claim 18 wherein said steps "a" through "e" are followed by any number of sensors present within said system that are proximally located to an object present therein such that said step "e" generates a time-stamp in relation to all such sensors generating a prolonged object presence indication signal substantially simultaneously and transmitted to said central database, thereby indicating the presence of an object of certain length within the space within the on-street parking system.

20. The algorithm of claim 18 wherein upon the evacuation of an object from the proximal vicinity of a sensor activates said notification means to indicate the movement of an object out of said space within the on-street parking system such that a signal is transmitted to said central database to generate a time-stamp memorializing such an space evacuation event; and wherein said central database further generates a notification signal in relation to said space evacuation event sensor activation to the extent that the previously filled spaced within the on-street parking system is now available.

* * * * *